United States Patent
Boothby

(10) Patent No.: US 12,505,165 B1
(45) Date of Patent: Dec. 23, 2025

(54) APPARATUS AND METHOD FOR TRIADIC USER MATCHING BASED ON PROFILE DATA

(71) Applicant: Boothby Therapy Services, LLC, Laconia, NH (US)

(72) Inventor: Maren E. Boothby, Laconia, NH (US)

(73) Assignee: Boothby Therapy Services, LLC, Laconia, NH (US)

( * ) Notice: Subject to any disclaimer, the term of this patent is extended or adjusted under 35 U.S.C. 154(b) by 0 days.

(21) Appl. No.: 19/240,255

(22) Filed: Jun. 17, 2025

(51) Int. Cl.
*G06F 16/9035* (2019.01)
*G06F 16/906* (2019.01)
*G06F 16/909* (2019.01)

(52) U.S. Cl.
CPC ........ *G06F 16/9035* (2019.01); *G06F 16/906* (2019.01); *G06F 16/909* (2019.01)

(58) Field of Classification Search
CPC ... G06F 16/9035; G06F 16/906; G06F 16/909
USPC ........................................................ 707/769
See application file for complete search history.

(56) References Cited

U.S. PATENT DOCUMENTS 10,452,729 B1 * 10/2019 Keegan ................. G06F 16/958
11,386,368 B1    7/2022 Schneider
2017/0364991 A1 * 12/2017 Noguchi ................ G06Q 30/06
2021/0124787 A1 *  4/2021 Jadav ................... G06F 16/9537
2022/0156334 A1 *  5/2022 De Paolis ........... G06F 16/9535
2024/0039905 A1 *  2/2024 Talavera ................ G06F 16/25
2025/0165546 A1 *  5/2025 Benchetrit .......... G06F 16/9536

OTHER PUBLICATIONS

Embarak, Ossama H., "Like-minded detector to solve the cold start problem.", 2018 Fifth HCT Information Technology Trends (ITT 2018), Dubai, United Arab Emirates, Nov. 28-29, 2018, pp. 1-6.*
Aiello, Luca Maria, et al., "Friendship Prediction and Homophily in Social Media", ACM Transactions on the Web (TWEB), vol. 6, Issue 2, Article No. 9, Jun. 4, 2012, pp. 1-33.*

* cited by examiner

*Primary Examiner* — Robert Stevens
(74) *Attorney, Agent, or Firm* — Caldwell Intellectual Property Law

(57) ABSTRACT

An apparatus and method for triadic user matching based on profile data are disclosed. The apparatus includes at least a processor, and a memory communicatively connected to the at least a processor, wherein the memory contains instructions that, when executed by the at least a processor, configure the at least a processor to receive a plurality of sets of profile data, classify a set of first user profile data into one or more first user classification groups, determine a triadic match including at least one second user and at least one third user associated with at least one first user as a function of a temporal availability element of each of the plurality of sets of profile data by using a triadic machine-learning model, append the triadic match to a database and modify a graphical user interface as a function of the triadic match.

20 Claims, 9 Drawing Sheets

APPARATUS AND METHOD FOR TRIADIC USER MATCHING BASED ON PROFILE DATA

FIELD OF THE INVENTION

The present invention generally relates to the field of machine learning. In particular, the present invention is directed to an apparatus and method for triadic user matching based on profile data.

BACKGROUND

Data matching systems are employed to pair users or entities based on structured data and traditional matching algorithms typically operate on a binary basis, assigning one entity to another. While effective in simple pairwise contexts, binary matching approaches are insufficient for use cases that require coordinated assignment of three or more participants. Existing data matching systems are typically rule-based or static, with limited ability to adapt to contextual factors. The field lacks robust technical solutions.

SUMMARY OF THE DISCLOSURE

In some aspects, the techniques described herein relate to an apparatus for triadic user matching based on profile data, the apparatus including at least a processor, and a memory communicatively connected to the at least a processor, wherein the memory contains instructions that, when executed by the at least a processor, configure the at least a processor to receive a plurality of sets of profile data including a set of first user profile data associated with at least one first user, a set of second user profile data associated with at least one second user, and a set of third user profile data associated with at least one third user, wherein each of the plurality of sets of profile data includes a temporal availability element and the set of first user profile data includes a first user descriptor, classify the set of first user profile data into one or more first user classification groups based on the first user descriptor, determine a triadic match including the at least one second user and the at least one third user associated with the at least one first user as a function of the temporal availability element of each of the plurality of sets of profile data and the one or more first user classification groups using a triadic machine-learning model that has been trained on historical triadic match data, append the triadic match to a database as at least a portion of historical record data, and modify a graphical user interface as a function of the triadic match.

In some aspects, the techniques described herein relate to a method for triadic user matching based on profile data, the method including receiving, using at least a processor, a plurality of sets of profile data including a set of first user profile data associated with at least one first user, a set of second user profile data associated with at least one second user, and a set of third user profile data associated with at least one third user, wherein each of the plurality of sets of profile data includes a temporal availability element and the set of first user profile data includes a first user descriptor, classifying, the at least a processor, the set of first user profile data into one or more first user classification groups based on the first user descriptor, determining, the at least a processor, a triadic match including the at least one second user and the at least one third user associated with the at least one first user as a function of the temporal availability element of each of the plurality of sets of profile data and the one or more first user classification groups using a triadic machine-learning model that has been trained on historical triadic match data, appending, the at least a processor, the triadic match to a database as at least a portion of historical record data, and modifying, the at least a processor, a graphical user interface as a function of the triadic match.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for triadic user matching based on profile data. The apparatus includes at least a processor, and a memory communicatively connected to the at least a processor, wherein the memory contains instructions that, when executed by the at least a processor, configure the at least a processor to receive a plurality of sets of profile data including a set of first user profile data associated with at least one first user, a set of second user profile data associated with at least one second user, and a set of third user profile data associated with at least one third user, wherein each of the plurality of sets of profile data includes a temporal availability element and the set of first user profile data includes a first user descriptor, classify the set of first user profile data into one or more first user classification groups based on the first user descriptor, determine a triadic match including the at least one second user and the at least one third user associated with the at least one first user as a function of the temporal availability element of each of the plurality of sets of profile data and the one or more first user classification groups using a triadic machine-learning model that has been trained on historical triadic match data, append the triadic match to a database as at least a portion of historical record data, and modify a graphical user interface as a function of the triadic match.

In another aspect, the apparatus can serve students in more remote locations without in-house or local clinical expertise. Rural or underserved schools have challenges meeting the needs of all students due to staffing availability and the apparatus can provide an in-person facilitator to ensure student engagement with the remote resource.

Exemplary embodiments illustrating aspects of the present disclosure are described below in the context of several specific examples.

Figure 1:
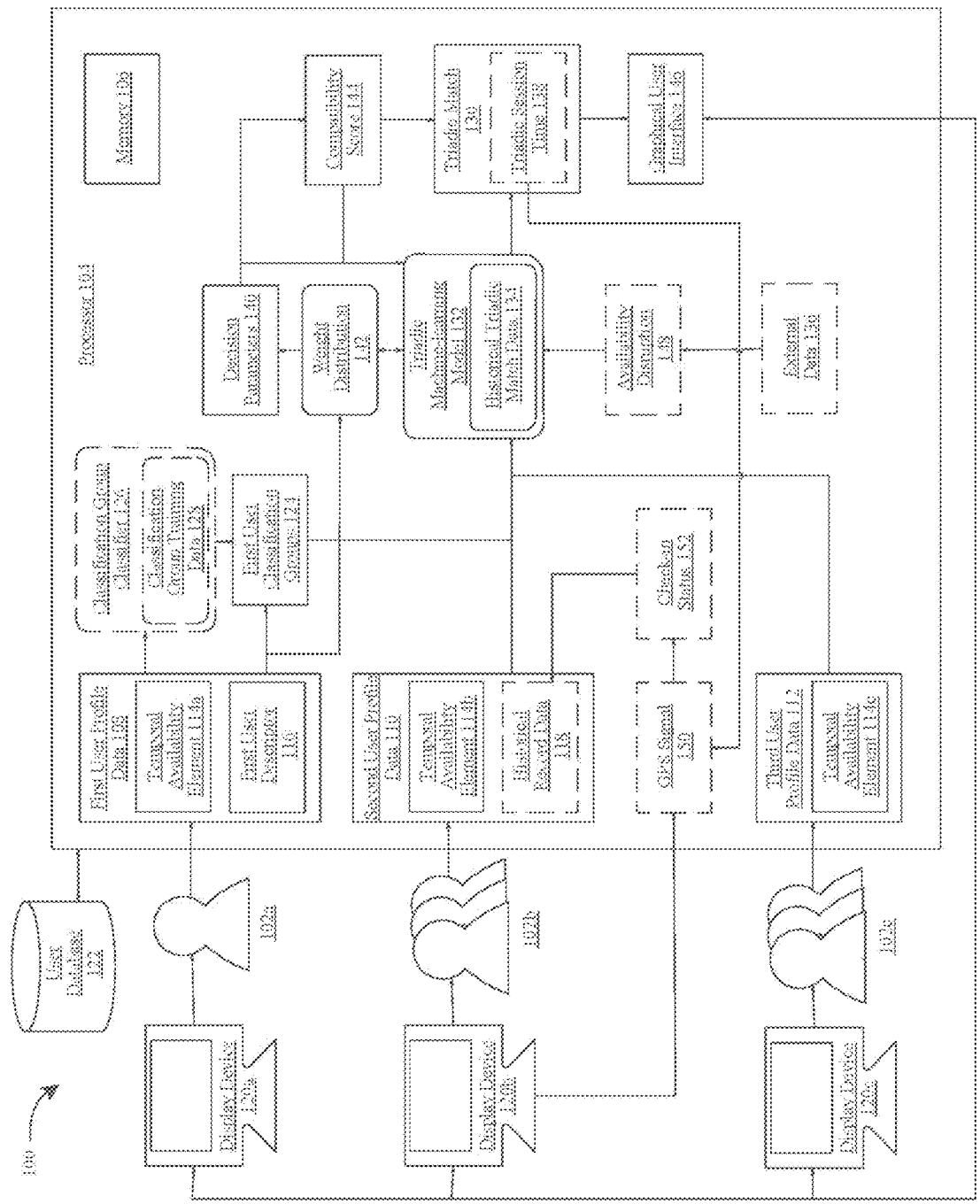
FIG. 1 illustrates a block diagram of an exemplary apparatus for triadic user matching based on profile data.

Referring now to FIG. 1, an exemplary embodiment of apparatus 100 for triadic user matching based on profile data is illustrated. For the purposes of this disclosure, "triadic user matching" is a process identifies and associates three distinct functional roles for a triadic session. For the purposes of this disclosure, a "triadic session" is a coordinated interaction involving at least three distinct users. As a non-limiting example, triadic session may be a coordinated instructional or therapeutic engagement designed to deliver targeted support services to students in need, particularly those located in rural or underserved regions where local clinical or educational expertise is unavailable. In a non-limiting example, triadic session may be conducted among three roles: a first user 102a, second user 102b, and third user 102c. For the purposes of this disclosure, a "first user" is an individual identified as the recipient of instructional, developmental, or therapeutic support services. In some embodiments, first user 102a may include a student located in a rural, remote, or otherwise underserved educational environment, where direct access to specialized professionals may be limited. For the purposes of this disclosure, a "second user" is an individual assigned to act as an in-person facilitator who is in geographic proximity to a first user. In a non-limiting example, second user 102b may be responsible for supporting the student's participation, mediating interaction with remote personnel, and ensuring engagement and continuity throughout the session. In some cases, second user 102b may be trained or certified in facilitation or educational support roles. For the purposes of this disclosure, a "third user" is a remotely located specialist who delivers expert guidance or instruction to the first user during the triadic session. As a non-limiting example, third user 102c may include a licensed therapist, clinician, or educator. In some cases, third user 102c may participate in a triadic session using a digital communication interface. The purpose of the triadic session may be to enable students with deficiencies or special needs to receive high-quality, consistent support by bridging the geographical gap between the student and the specialist through the presence of a trained local facilitator. The triadic session supports synchronous interaction, ensures accountability, and maintains instructional or therapeutic continuity, even in contexts where on-site professional staffing is limited or unavailable. In this disclosure, a first user 102a may correspond to a "student," a second user 102b may correspond to a "facilitator," and a third user 102c may correspond to a "specialist" or "therapist."

With continued reference to FIG. 1, apparatus 100 may include circuitry such as without limitation a processor 104 communicatively connected to a memory 106; for instance, circuitry may include and/or be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, as used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 106 contains instructions configuring processor 104 to receive a plurality of sets of profile data including a set of first user profile data 108 associated with at least one first user, a set of second user profile data 110 associated with at least one second user, and a set of third user profile data 112 associated with at least third user. For the purposes of this disclosure, "profile data" is a compilation of data associated with a plurality of users. For the purposes of this disclosure, "first user profile data" is information associated with a first user. In an embodiment, first user profile data 108 may include numerical, textual, or categorical elements, which may be processed, analyzed, or stored by a computing system. As a non-limiting example, first user profile data 108 may include student information such as names, age, location, grade levels, individualized education program (IEP) status, language proficiency levels, and transportation needs.

With continued reference to FIG. 1, first user profile data 108 includes a temporal availability element 114a. For the purposes of this disclosure, a "temporal availability element" is a data element of first user profile data representing one or more time intervals during which a user is available to participate in a triadic session. In some cases, temporal availability element 114a may be expressed in absolute terms. As a non-limiting example, temporal availability element 114a may include calendar dates and times. In some cases, temporal availability element 114a may be in relative terms. As a non-limiting example, temporal availability element 114a may include recurring time blocks (e.g., weekdays between 9:00 AM and 12:00 PM). In some embodiments, temporal availability element 114a may include scheduling constraints, session duration limits, school calendar exceptions, or time zone information.

With continued reference to FIG. 1, first user profile data 108 includes a first user descriptor 116. For the purposes of this disclosure, a "first user descriptor" is a data element of first user profile data representing characteristics of a first user. In an embodiment, first user descriptor 116 may include educational or clinical information. As a non-limiting example, first user descriptor 116 may include diagnosed deficiency type, severity level, support service history, communication assistance requirements or interaction requirement, behavioral intervention status, or other individualized criteria. For the purposes of this disclosure, a "deficiency type" is a classification associated with a first user that identifies the nature of an educational, developmental, behavioral, or communicative challenge experienced by the first user. In an embodiment, deficiency type may include categories such as speech or language impairment, autism spectrum disorder, attention-deficit/hyperactivity disorder (ADHD), learning disabilities, emotional disturbance, or physical impairments. In some cases, deficiency type may be derived from diagnostic records, individualized education program (IEP) documentation, clinical evaluations, or school-based assessments. For the purposes of this disclosure, "severity" is a measure of the extent, intensity, or functional impact of the deficiency type associated with a first user. In some cases, severity may be represented as a categorical value (e.g., mild, moderate, severe), a numerical score derived from standardized assessment instruments, or a set of qualitative indicators evaluated by an educational or clinical professional. The severity classification may influence the priority of certain decision parameters, such as the required expertise level of a third user 102c or the facilitation intensity needed from a second user 102b. For the purposes of this disclosure, "interaction requirements" are specific conditions, supports, or accommodations necessary to enable effective communication, engagement, or instructional participation for a first user during a triadic session. As a non-limiting example, interaction requirements may include the need for visual supports, interpreter services, communication devices, behavior reinforcement strategies, proximity-based prompting by the second user, or pacing modifications. In an embodiment, interaction requirements may include physical resources such as a laptop, microphone, headphones, assistive communication device, or display screen. In some cases, interaction requirements may be inferred from related profile elements.

With continued reference to FIG. 1, for the purposes of this disclosure, "second user profile data" is information associated with a second user. As a non-limiting example, second user profile data 110 may include a user identifier, name, contact information, geographic location, professional background, facilitation credentials, assigned school regions, travel constraints, and historical record data 118. As another non-limiting example, second user profile data 110 may include performance metrics, such as engagement effectiveness scores based on feedback from first and third users, punctuality records, and backfill history. Second user profile data 110 includes a temporal availability element 114*b*. As a non-limiting example, temporal availability element 114*b* may include a representation of time intervals during which a second user 102*b* is available to participate in scheduled triadic sessions. Temporal availability element 114*b* may include recurring weekly time blocks, date-specific windows, or exception-based entries indicating blackout periods, partial-day coverage, or short-notice availability.

With continued reference to FIG. 1, for the purposes of this disclosure, "historical record data" is data representing records of past session participation by a second user. As a non-limiting example, historical record data 118 may include check-in status, session completion status, punctuality, duration of presence, and location verification. In an embodiment, historical record data 118 may be associated with a second user 102*b*. In some embodiments, historical record data 118 may include timestamps of session start and end, global positioning system (GPS)-based location confirmations, session cancellations, no-show events, and backfill occurrences. The historical record data 118 may be stored in a memory 106 and may be used to generate derived metrics such as an absence score, reliability index, attendance consistency rating, or the like. The absence score disclosed herein is further described below.

With continued reference to FIG. 1, for the purposes of this disclosure, "third user profile data" is information associated with a third user. As a non-limiting example, third user profile data 112 may include a user identifier, name, credentials, licensure status, area of professional specialization (e.g., speech-language pathology, occupational therapy, behavioral health), language proficiency, and remote service delivery capability. As another non-limiting example, third user profile data 112 may include historical session records, feedback received from first and second users, digital platform compatibility, and jurisdictional eligibility for service provision. Third user profile data 112 includes a temporal availability element 114*c*. As a non-limiting example, temporal availability element 114*c* may include a representation of time intervals during which a third user 102*c* is available to participate in scheduled triadic sessions. For example, and without limitation, temporal availability element 114*c* may include temporal availability element 114*c* may include weekday and weekend blocks, fixed daily availability ranges, recurring schedule patterns, or customized entries specifying availability on specific dates or within predefined hours.

With continued reference to FIG. 1, in some embodiments, processor 104 may receive first user profile data 108, second user profile data 110, and third user profile data 112 from a display devices 120*a*-*c*. For the purposes of this disclosure, a "display device" is any device that users may use to input data. As a non-limiting example, display devices 120*a*-*c* may include a laptop, desktop, tablet, mobile phone, smart phone, smart watch, kiosk, screen, smart headset, or things of the like. In some embodiments, display devices 120*a*-*c* may include an interface configured to receive inputs from users 102*a*-*c*. In some embodiments, users 102*a*-*c* may manually input any data into apparatus 100 using display devices 120*a*-*c*. In some embodiments, users 102*a*-*c* may have a capability to process, store or transmit any information independently.

With continued reference to FIG. 1, in some embodiments, processor 104 may receive first user profile data 108, second user profile data 110, and third user profile data 112 from a user database 122. As used in this disclosure, a "user database" is a data structure configured to store data associated with users. As a non-limiting example, user database 122 may store first user profile data 108, second user profile data 110, third user profile data 112, and any information or data associated with the profile data as described below. In one or more embodiments, user database 122 may include inputted or calculated information and datum related to users 102*a*-*c*. In some embodiments, a datum history may be stored in user database 122. As a non-limiting example, the datum history may include real-time and/or previous inputted data related to users 102*a*-*c*. As a non-limiting example, user database 122 may include instructions from a user, who may be an expert user, a past user in embodiments disclosed herein, or the like, where the instructions may include examples of the data related to users 102*a*-*c*.

With continued reference to FIG. 1, in some embodiments, processor 104 may be communicatively connected with user database 122. For example, and without limitation, in some cases, user database 122 may be local to processor 104. In another example, and without limitation, user database 122 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network.

With continued reference to FIG. 1, in some embodiments, user database 122 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, memory 106 contains instructions configuring processor 104 to classify first user profile data 108 into one or more first user classification groups 124 based on a first user descriptor 116. For the purposes of this disclosure, a "first user classification group" is a categorization of first users based on shared educational, developmental, behavioral, or support-related characteristics. In an embodiment, a first user classification group 124 may be determined by analyzing first user descriptor 116, including, but not limited to, deficiency type, severity level, language proficiency, communication needs, behavioral support requirements, or educational placement. For example, and without limitation, a first user classification group 124 may include students with moderate speech-language impairments requiring frequent remote specialist interaction and high in-person facilitation support, while another first user classification group 124 may include students with mild behavioral needs who require minimal facilitation and greater scheduling flexibility. For example, and without limitation, first user profile data 108 may include a first user descriptor 116 indicating that a first user 102a is diagnosed with a moderate speech-language impairment, requires visual supports, and participates in an Individualized Education Program (IEP) with weekly speech therapy goals, based on this descriptor, processor 104 may classify the first user 102a into a first user classification group 124 corresponding to "moderate expressive language deficiency with structured facilitation support." For example, and without limitation, first user descriptor 116 may indicate that a first user 102a has a mild hearing impairment, no behavioral intervention needs, and is in a general education setting with occasional access to a remote audiologist and processor 104 may classify first user profile data 108 into a first user classification group 124 corresponding to "low-support auditory access students." In some embodiments, processor 104 may assign a first user to one or more first user classification group 124 using a rule-based classifier (e.g., classification group classifier 126) or a machine-learning model trained on exemplary first user profile data correlated to exemplary first user classification groups. In some embodiments, first user classification group 124 may be stored in user database 122 and processor 104 may retrieve from the user database 122. In some embodiments, user may manually determine first user classification group 124.

With continued reference to FIG. 1, in some embodiments, processor 104 may classify first user profile data 108 into first user classification group 124 using a classification group classifier 126. As used in this disclosure, a "classification group classifier" is a machine-learning model, such as a mathematical model, neural net, or program generated by a machine learning algorithm known as a "classification algorithm," that sorts administration data related inputs into categories or bins of data, outputting one or more first user groups associated therewith. The classification group classifier 126 disclosed herein may be consistent with a classifier disclosed with respect to FIG. 3. The training data disclosed herein is further disclosed with respect to FIG. 3. In some embodiments, classification group training data 128 may be stored in user database 122. In some embodiments, classification group training data 128 may include exemplary first user profile data correlated to exemplary first user classification groups. In some embodiments, classification group training data 128 may be received from one or more users, user database 122, external computing devices, and/or previous iterations of processing. As a non-limiting example, classification group training data 128 may include instructions from a user, who may be an expert user, a past user in embodiments disclosed herein, or the like, which may be stored in memory and/or stored in user database 122, where the instructions may include labeling of training examples.

With continued reference to FIG. 1, processor 104 may be configured to generate a classifier (such as but not limited to classification group classifier 126) using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier (such as but not limited to classification group classifier 126) using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2}$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 104 may be configured to classify first user profile data 108 into one or more first user classification groups 124 using a group lookup table. For the purposes of this disclosure, a "group lookup table" is a lookup table that relates first user data to one or more first user classification groups. In some embodiments, processor 104 may 'lookup' given first user profile data 108 and find a corresponding first user classification group 124 using group lookup table. As a non-limiting example, group lookup table may correlate first user profile data 108 with first 'first user descriptor 116' to first 'first user classification group 124.' As another non-limiting example, group lookup table may correlate first user profile data 108 with second 'first user descriptor 116' to second 'first user classification group 124.' A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, memory 106 contains instructions configuring processor 104 to determine a triadic match 130 including at least one second user 102b and at least one third user 102c associated with at least one first user 102a as a function of a temporal availability element 114a-c of each of profile data 108, 110 and 112 by using a triadic machine-learning model 132 that has been trained on historical triadic match data 134. For the purposes of this disclosure, a "triadic match" is an assignment of three users to one triadic session based on profile compatibility and scheduling feasibility. In a non-limiting example, a triadic match 130 may include a first user 102a, such as a student requiring support services, a second user 102b, such as a facilitator who is available to meet the student in person and provide on-site support, and a third user 102c, such as a remotely located therapist or specialist who provides services using a communication platform. In some embodiments, processor 104 may store triadic match 130 in user database 122 and processor 104 may retrieve triadic match 130 from the user database 122. In some embodiments, user may manually determine or input triadic match 130.

With continued reference to FIG. 1, for the purposes of this disclosure, a "triadic machine-learning model" is a computational model configured to receive first user profile data, second user profile data, and third user profile data, and to generate a triadic match based on learned patterns in historical triadic match data. In an embodiment, triadic machine-learning model 132 may be implemented using a supervised learning architecture trained on labeled triadic match outcomes, where training data may include successful and unsuccessful triadic sessions, user classifications, compatibility indicators, engagement feedback, and session outcomes. In some embodiments, triadic machine-learning model 132 may incorporate contextual data such as external events (e.g., external data 136), facilitator reliability, or specialist workload to optimize the matching outcome. In some embodiments, processor 104 may store a trained version of triadic machine-learning model 132 in user database 122 and retrieve triadic machine-learning model 132 from user database 122 at runtime. In some embodiments, triadic machine-learning model 132 may be periodically retrained based on updated triadic match data, user feedback (e.g., user interaction), or newly classified user profiles.

With continued reference to FIG. 1, in some embodiments, processor 104 may be configured to generate triadic training data. In a non-limiting example, triadic training data may include correlations in historical triadic match data 134. For the purposes of this disclosure, "historical triadic match data" is data representing previously executed or attempted triadic matches involving at least one first user, one second user, and one third user. In an embodiment, historical triadic match data 134 may include identifiers of users involved in each triadic session, triadic session time 138, selected decision parameters 140 and weight distribution 142 used at the time of the match, computed compatibility score 144, and the final outcome of the session. For example, and without limitation, historical triadic match data 134 may record whether a session was completed, cancelled, missed, or modified, as well as engagement quality metrics, attendance logs, feedback from participants, and check-in status confirmations. In certain embodiments, historical triadic match data 134 may be stored in user database 122 and continuously updated as new triadic sessions are completed, thereby improving the accuracy and personalization of future triadic match predictions. In some embodiments, triadic training data may be stored in user database 122. In some embodiments, triadic training data may be received from one or more users, user database 122, external computing devices, and/or previous iterations of processing. As a non-limiting example, triadic training data may include instructions from a user, who may be an expert user, a past user in embodiments disclosed herein, or the like, which may be stored in memory and/or stored in user database 122, where the instructions may include labeling of training examples. In some embodiments, triadic training data may be updated iteratively on a feedback loop. As a non-limiting example, processor 104 may update triadic training data iteratively through a feedback loop as a function of first user profile data 108, second user profile data 110, third user profile data 112, first user descriptor 116, temporal availability elements 114*a-c*, first user classification group 124, or the like. In some embodiments, processor 104 may be configured to generate a triadic machine-learning model 132. In a non-limiting example, generating triadic machine-learning model 132 may include training, retraining, or fine-tuning triadic machine-learning model 132 using triadic training data or updated triadic training data. In some embodiments, triadic machine-learning model 132 may have been trained with triadic training data. In some embodiments, processor 104 may be configured to determine triadic match 130 using triadic machine-learning model 132 (i.e., trained or updated triadic machine-learning model 132). In some embodiments, triadic machine-learning model 132 may receive first user profile data 108, second user profile data 110, third user profile data 112 and first user classification group 124 as inputs and may output triadic match 130 in response to the inputs. In some embodiments, generating training data and training machine-learning models may be simultaneous. In some embodiments, processor 104 may generate triadic match 130 without the use of triadic machine-learning model 132. In some embodiments, triadic machine-learning model 132 may function differently between training time and inference time. In a non-limiting example, at training time, processor 104 may be configured to train, retrain, or fine-tune triadic machine-learning model 132 using triadic training data. During the training time, triadic machine-learning model 132 may learn to associate patterns within historical triadic match data 134 or triadic training data with first user profile data 108, second user profile data 110, third user profile data 112 and first user classification group 124. In a non-limiting example, at inference time, trained triadic machine-learning model 132 may be configured to receive previously unseen first user profile data 108, second user profile data 110, third user profile data 112 and first user classification group 124 and, based on the representations learned during training time, automatically output a selection of triadic match 130 corresponding to first user profile data 108, second user profile data 110, third user profile data 112 and first user classification group 124. Inference may be triggered in response to a user request, system event, or automated workflow operation.

With continued reference to FIG. 1, triadic machine-learning model 132 may be configured to select a weight distribution 142 over a plurality of decision parameters 140 of a triadic machine-learning model 132 as a function of one or more first user classification groups 124. For the purposes of this disclosure, a "decision parameter" is a factor relevant to evaluating the compatibility or feasibility of assigning a first user, a second user, and a third user to a shared triadic session. In an embodiment, decision parameters 140 may include temporal availability overlap among the first, second, and third users, physical proximity between the first user 102*a* and the second user 102*b*, compatibility between user descriptors such as deficiency type, facilitator qualifications, and specialist expertise, historical record data 118 of a second user 102*b*, resource availability, and contextual or environmental factors (e.g., external data 136) such as availability disruptions derived from external data sources. In some embodiments, processor 104 may a weight to each decision parameter 140 as part of a weight distribution 142 to compute a compatibility score 144 for each candidate triadic match. For example, and without limitation, processor 104 may evaluate whether a second user 102*b* is located within a predefined distance of a first user 102*a*, whether all three users share overlapping time intervals (temporal availability elements 114*a-c*), whether a third user 102*c* possesses credentials aligned with a deficiency type of the first user 102*a*, and the like. In some embodiments, decision parameters 140 may be expressed as numerical values, categorical classifications, binary indicators, or time-based metrics. In some embodiments, decision parameters 140 may be assembled into a feature vector for processing by a triadic machine-learning model 132. In some embodiments, decision parameters 140 may be updated dynamically in response to real-time data inputs or changes to user profiles.

With continued reference to FIG. 1, for the purposes of this disclosure, a "weight distribution" is an allocation of weights assigned to each of a plurality of decision parameters. For the purposes of this disclosure, a "weight" is a numerical value assigned to a specific decision parameter. In an embodiment, each weight may represent relative significance or influence of its associated decision parameter 140 within a weight distribution 142. The weight distribution 142 may be represented as a normalized vector or matrix in which the sum of all weights satisfies a predefined condition (e.g., summing to one). For example, and without limitation, a higher weight applied to a temporal availability overlap parameter may indicate that scheduling feasibility is prioritized over physical proximity or descriptor compatibility in a given triadic match computation. Weights may be expressed as scalar values, percentages, or normalized values (e.g., values summing to one across the full set of decision parameters). In some embodiments, weight distribution may be selected by processor 104 based on a first user classification group 124, allowing processor 104 to adapt the triadic match evaluation process according to the needs or characteristics of first user 102*a*. For example, and without limitation, a first user 102*a* classified with a severe communication impairment may trigger a weight distribution 142 that assigns higher weight to facilitator qualifications and lower weight to physical proximity, whereas a first user 102*a* with minimal support needs may receive a distribution emphasizing scheduling flexibility. In certain embodiments, weights may be learned values generated by training triadic machine-learning model 132 on historical triadic match data 134. In other embodiments, weights may be modified in real time based on system feedback, session rejection data, or manual overrides provided through graphical user interface 146.

With continued reference to FIG. 1, in some embodiments, selecting weight distribution 142 may include selecting weight distribution 142 over at least physical proximity between at least one first and second users, descriptor compatibility between at least one first, second and third users, and a temporal availability overlap among at least one first, second and third users of a plurality of decision parameters 140 as a function of a deficiency type of one or more first user classification groups 124. For the purposes of this disclosure, "physical proximity" refers to a geographic distance between locations of a first user and a second user. In an embodiment, physical proximity may be calculated using GPS coordinates, school site designations, or address-level location data. In an embodiment, physical proximity may be expressed as a numerical distance value or as a categorical proximity tier (e.g., local, adjacent region, or out-of-region). In some embodiments, processor 104 may use physical proximity as a decision parameter 140. For the purposes of this disclosure, "descriptor compatibility" refers to a degree of alignment between characteristics of a first user, second user and third user. In an embodiment, descriptor compatibility may be determined by processor 104 based on factors such as the match between a first user's deficiency type and a third user's clinical or instructional specialization, a second user's facilitation experience or training history, communication support requirements, language compatibility, or behavioral accommodation capabilities. Descriptor compatibility may be computed as a decision parameter 140 and may influence the weight distribution when the deficiency type of the first user requires specialized support. For the purposes of this disclosure, "temporal availability overlap" refers to a shared time interval during which a first user, second user, and third user are concurrently available to participate in a triadic session. In an embodiment, processor 104 may determine temporal availability overlap by comparing temporal availability elements 114a-c of each user's profile data and computing the intersection of available time windows. The resulting overlap may be evaluated based on duration, alignment with instructional schedules, and compliance with session length requirements. In some embodiments, temporal availability overlap may serve as a primary constraint in triadic match determination and may receive the highest weight in weight distribution 142 when availability alignment is prioritized for corresponding first user classification group 124.

With continued reference to FIG. 1, triadic machine-learning model 132 may be configured to determine a compatibility score 144 for each potential triadic match 130 by applying selected weight distribution 142 to a plurality of decision parameters 140. For the purposes of this disclosure, a "compatibility score" is a value that represents an assessment of the suitability of a candidate triadic match for assignment to a triadic session. In an embodiment, compatibility score 144 may be calculated by applying a weight distribution 142 to a plurality of decision parameters 140, wherein each decision parameter 140 may contribute to a final score according to its assigned weight. For example, and without limitation, compatibility score 144 may be computed as a weighted sum, a normalized metric, or a model-derived prediction score output by a trained machine-learning algorithm. For example, and without limitation, processor 104 may compute compatibility score 144 as a weighted sum of individual parameter values, where each parameter may be multiplied by its corresponding weight from weight distribution 142. In a non-limiting example, decision parameters 140 may include a temporal availability overlap parameter with a normalized value of 0.9, a physical proximity parameter with a normalized value of 0.7, and a descriptor compatibility parameter with a normalized value of 0.8. If the corresponding weight distribution assigns a weight of 0.5 to temporal availability overlap, 0.2 to physical proximity, and 0.3 to descriptor compatibility, processor 104 may compute the compatibility score as: (0.9×0.5)+ (0.7×0.2)+ (0.8×0.3)=0.45+0.14+0.24=0.83. In this example, the resulting compatibility score 144 is 0.83. In some embodiments, compatibility scores 144 may be stored in user database 122 and used by processor 104 to drive scheduling decisions, conflict resolution, or prioritization in constrained resource environments. In some embodiments, user may manually determine compatibility score 144.

With continued reference to FIG. 1, in some embodiments, processor 104 may compare compatibility scores 144 across multiple candidate triadic combinations (candidate triadic match) and select the triadic match 130 with the highest compatibility score. For example, and without limitation, processor 104 may generate three candidate triadic matches for a first user 102a: a first candidate including first 'second user 102b' and first 'third user 102c' with a compatibility score 144 of 0.76, a second candidate including second 'second user 102b' and second 'third user 102c' with a compatibility score 144 of 0.84, and a third candidate including third 'second user 102b' and third 'third user 102c' with a compatibility score 144 of 0.81. In this example, processor 104 may identify the second candidate triadic match including the second 'second user 102b' and second 'third user 102c' as having the highest compatibility score 144 of 0.84 and select that combination as triadic match 130 to be scheduled for a first user 102a.

With continued reference to FIG. 1, in some embodiments, compatibility score 144 may incorporate adjustment factors based on user interaction feedback, session history, or real-time availability changes. For example, and without limitation, processor 104 may initially compute a compatibility score 144 of 0.83 for a candidate triadic match using weighted decision parameters as previously described. If the second user 102b associated with the match has a historical attendance reliability parameter indicating a recent pattern of unexcused absences, processor 104 may apply a negative adjustment factor of −0.05 to compatibility score 144, reducing the compatibility score 144 to 0.78. Additionally, if external weather data parsed by processor 104 indicates a high probability of regional travel disruptions affecting the second user's location, a further adjustment factor of −0.03 may be applied, reducing the compatibility score 144 to 0.75. Conversely, if a third user 102c associated with triadic match 130 has received consistently high feedback scores from previous sessions involving similar first user classification groups, processor 104 may apply a positive adjustment factor of +0.04, resulting in a final compatibility score 144 of 0.79. In some embodiments, these adjustment factors may be predefined, learned from historical outcome data, or user-configurable through graphical user interface 146 to reflect operational preferences, staffing constraints, or session quality metrics.

With continued reference to FIG. 1, in some embodiments, determining triadic match 130 may include generating an absence score of at least one second user 102b based on historical record data 118 of second user profile data 110 and determining triadic match 130 as a function of the absence score. For the purposes of this disclosure, an "absence score" is a value that represents a measure of the likelihood that a second user will be unavailable for a triadic session. In an embodiment, absence score may be computed based on historical record data 118 associated with second user 102b, including, but not limited to, prior session attendance history, frequency of unexcused absences, late arrivals, session cancellations, and failed GPS check-in events. In some embodiments, absence score may be expressed as a probability value or risk index, where higher values correspond to greater likelihood of future unavailability. For example, and without limitation, a second user 102b with a consistent history of missed sessions may be assigned an absence score of 0.85, whereas a second user 102b with a strong attendance record may receive an absence score of 0.10. In some embodiments, processor 104 may use the absence score as a decision parameter during computation of the compatibility score or as a filtering condition when determining candidate triadic matches. For example, and without limitation, processor 104 may compute an absence score of 0.80 for a second user 102b based on historical record data 118 indicating multiple recent unexcused absences and failed GPS check-ins and processor 104 may apply a negative adjustment to compatibility score 144 for any candidate triadic match 130 that includes the second user 102b, reducing the overall score to reflect the increased risk of session failure. In some embodiments, processor 104 may apply a threshold-based filtering condition in which any candidate second user 102b with an absence score exceeding a certain number is excluded from consideration for the current triadic session and processor 104 may disregard the second user 102b as a candidate and continue evaluating other second users with more favorable attendance reliability. In other embodiments, the absence score may be used to trigger preemptive reassignment, backfill prioritization, or alert generation within graphical user interface 146. In some embodiments, absence score may be stored in user database 122 and processor 104 may retrieve absence score from user database 122. In some embodiments, user may manually determine absence score. In some embodiments, processor 104 may determine absence score using a machine-learning model (e.g., triadic machine-learning model 132).

With continued reference to FIG. 1, in some embodiments, determining triadic match 130 may include determining a triadic session time 138 as a function of temporal availability element 114a-c of each of first user profile data 108, second user profile data 110 and third user profile data 112. For the purposes of this disclosure, a "triadic session time" is a scheduled time interval during which a triadic session involving at least one first user, one second user, and one third user is intended to occur. In some embodiments, triadic session time 138 may represent a mutually available time window in which all three users are concurrently able to participate in a coordinated session. In some embodiments, processor 104 may compute triadic session time 138 by identifying the intersection of individual user availability blocks and applying additional constraints such as facilitator travel time, session duration requirements, or institutional scheduling policies. For example, and without limitation, first user 102a may be available from 9:00 AM to 12:00 PM, second user 102b may be available from 10:00 AM to 2:00 PM, and third user 102c may be available from 10:30 AM to 11:30 AM on the same day and processor 104 may compute the intersection of these intervals and determine that the time from 10:30 AM to 11:30 AM represents a valid triadic session time 138. In some embodiments, processor 104 may prioritize temporal availability element 114a of first user 102a in the determination of triadic session time 138. In an embodiment, processor 104 may compute triadic session time 138 such that it falls entirely within the availability window of first user 102a, while seeking the largest possible intersection with the availability windows of second user 102b and third user 102c. For example, and without limitation, if first user 102a is only available from 1:00 PM to 2:00 PM, while second user 102b is available from 12:30 PM to 3:30 PM and third user 102c is available from 12:00 PM to 1:30 PM, processor 104 may determine that the triadic session time 138 should be from 1:00 PM to 1:30 PM to accommodate all users while strictly conforming to the temporal constraints of the first user 102a.

With continued reference to FIG. 1, in some embodiments, determining triadic match 130 may include parsing external data 136 including weather data, determining an availability disruption 148 as a function of the external data 136 and second user profile data 110 and determining triadic match 130 as a function of the availability disruption 148. For the purposes of this disclosure, "external data" is data originating from sources outside of first user profile data, second user profile data, and third user profile data. In an embodiment, external data 136 may include information retrieved from third-party systems, public data feeds, institutional databases, or sensor-based systems. For example, and without limitation, external data 136 may include weather data, local event calendars, school holiday schedules, traffic conditions, regional emergency alerts, or real-time transportation delays. For the purposes of this disclosure, "weather data" is a type of external data that includes meteorological information. In an embodiment, weather data may include, but is not limited to, temperature, precipitation forecasts, severe weather alerts, wind conditions, visibility levels, and real-time weather advisories associated with the geographic region of a second user 102b or designated session location. In some embodiments, processor 104 may retrieve weather data from external weather data sources such as public application programming interfaces (APIs), regional meteorological services, or institutional databases, and may use the data to identify potential disruptions to facilitator travel, school closures, or changes in session feasibility. For example, and without limitation, processor 104 may detect an incoming snowstorm affecting the geographic area of second user 102b and compute an availability disruption, which may result in a reduced compatibility score 144 for a candidate triadic match 130 or trigger a backfill reassignment. In some embodiments, processor 104 may store weather data in memory 106 and associate it with temporal and geographic metadata to support historical analysis and predictive modeling. In some embodiments, processor 104 may parse external data 136 to identify contextual factors that could affect session feasibility, user availability, or travel conditions, and may incorporate such factors into the computation of availability disruptions, adjustment of compatibility scores 144, or triggering of substitute assignments. In some embodiments, external data 136 may be continuously ingested, cached in memory 106, and used in real time to support dynamic triadic session planning, proactive backfilling, or risk mitigation strategies.

With continued reference to FIG. 1, in some embodiments, external data 136 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. The web crawler may be seeded and/or trained with a reputable website to begin the search. Web crawler may be generated by processor 104. In some embodiments, web crawler may be trained with information received from user through a user interface. In some embodiments, web crawler may be configured to generate a web query. A web query may include search criteria received from user. For example, user may submit a plurality of websites for web crawler to search to external data 136. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 104, received from a machine learning model, and/or received from user. In some embodiments, a relevancy score may include a range of numerical values that may correspond to a relevancy strength of data received from a web crawler function. As a non-limiting example, a web crawler function may search the Internet for external data 136 related to users.

With continued reference to FIG. 1, for the purposes of this disclosure, an "availability disruption" is a condition indicating that a second user may be partially or fully unavailable for a scheduled triadic session. In an embodiment, an availability disruption 148 may be determined by processor 104 based on external data 136, such as adverse weather conditions, local school closures, regional events, traffic incidents, or public safety advisories and temporal availability element 114b. For example, and without limitation, processor 104 may parse weather data and determine that a snowstorm warning in the geographic area of the second user 102b poses a high risk of travel delay, resulting in an availability disruption. In some embodiments, an availability disruption 148 may trigger a downward adjustment to compatibility score 144 of a candidate triadic match, flag a session for reassignment or rescheduling, or initiate retrieval of a substitute from a facilitator backfill queue. In some embodiments, processor 104 may log availability disruptions 148 in historical record data 118 and use them to improve predictive scheduling accuracy or reliability scoring over time.

With continued reference to FIG. 1, in some embodiments, processor 104 may be configured to receive a global positioning system (GPS) signal 150 from a device (e.g., display device 120b) associated with at least one second user 102b at the triadic session time 138 and determine a check-in status 152 of at least one second user 102b by comparing GPS coordinates of the GPS signal 150 with a location of at least one first user 102a. For the purposes of this disclosure, a "GPS signal" is a signal received from a global positioning system-enabled device associated with a user. In an embodiment, GPS signal 150 may include geospatial coordinates such as latitude, longitude, and altitude along with a timestamp indicating when location data was recorded. In some embodiments, processor 104 may receive a GPS signal 150 from a display device 120b during a check-in procedure occurring at triadic session time 138 and compare the GPS coordinates contained in a signal with a known or designated location of first user 102a. This comparison may be used to determine a check-in status 152, verify session attendance, or log the second user's presence as part of historical record data 118. In some embodiments, GPS signal data may be processed in real time and stored in user database 122 for compliance tracking, facilitator reliability analysis, or automated alert generation in cases of absence or mismatch between expected and actual locations.

With continued reference to FIG. 1, for the purposes of this disclosure, a "check-in status" is an indicator that reflects whether a second user has physically arrived at a designated location of a first user at scheduled triadic session time. In an embodiment, processor 104 may determine check-in status 152 by receiving a GPS signal 150 from a device associated with a second user 102b at or near triadic session time 138 and comparing the GPS coordinates of the GPS signal 150 to a known location of a first user 102a. For example, and without limitation, if the coordinates fall within a predefined proximity threshold, processor 104 may determine that check-in status 152 is positive, indicating that the second user 102b is present for the session. For example, and without limitation, if the coordinates do not align with the location of the first user 102a, or if no GPS signal is received within an allowable check-in window, processor 104 may determine that check-in status 152 is negative. In some embodiments, check-in status 152 may be stored in historical record data 118 and used to evaluate facilitator reliability, log attendance, trigger alerts, or initiate backfill procedures. In certain embodiments, check-in status 152 may also be displayed in real time through graphical user interface 146 for administrative monitoring and session compliance tracking. In some embodiments, determining triadic match 130 may include logging an event as a record failure in historical record data 118 when check-in status 152 indicates that a location of at least one second user 102b does not correspond to a location of at least one first user 102b at triadic session time 138.

With continued reference to FIG. 1, in some embodiments, determining triadic match 130 may include logging an event as a record failure in historical record data 118 when check-in status 152 indicates that a location of at least one second user 102b does not correspond to a location of at least one first user 102a at triadic session time 138. For the purposes of this disclosure, a "record failure" is an event that indicates a failure of one or more conditions necessary for successful execution of a scheduled triadic session involving a first user, a second user, and a third user. In an embodiment, a record failure may be generated by processor 104 when check-in status 152 indicates that second user 102b was not physically present at the location of first user 102a at triadic session time 138. In some embodiments, a record failure may be generated under other session execution failures, including, but not limited to, failure to initiate or complete a session, absence of one or more required users, failed system authentication, or communication platform errors. In some embodiments, processor 104 may associate a record failure with metadata including a timestamp, session identifier, user identifiers, and a failure reason code. Record failures may be used by processor 104 to update absence scores, adjust facilitator reliability metrics, and inform future triadic match decisions. In some embodiments, record failures may be displayed through graphical user interface 146 for administrative review, auditing, or triggering of automated backfill or escalation protocols. For example, and without limitation, at the scheduled triadic session time 138, processor 104 may receive a GPS signal 150 from a mobile device (e.g., display device 120b) associated with second user 102b. Processor 104 may compare GPS coordinates in the GPS signal 150 to expected location of first user 102a or triadic session, such as a school site or predefined session location stored in first user profile data 108. If the received GPS coordinates fall outside a predefined geographic threshold, or if no GPS signal 150 is received during the session window (e.g., triadic session time 138), processor 104 may determine that check-in status 152 is negative. In response, processor 104 may log an event as a record failure in historical record data 118, indicating that the second user 102b failed to appear at the correct location for the triadic session. In some embodiments, this logged record failure may be used to update an absence score, affect future compatibility scoring, or trigger a compliance alert through graphical user interface 146. In some embodiments, repeated record failures associated with a second user 102b may influence facilitator reliability metrics or initiate administrative review for reassignment.

With continued reference to FIG. 1, memory 106 contains instructions configuring processor 104 to append triadic match 130 to a database (e.g., user database 122) as at least a portion of historical record data. In an embodiment, processor 104 may record metadata associated with triadic match XXX. As a non-limiting example, processor 104 may record triadic session time 138, compatibility score 144, first user classification group 124, any associated availability, reliability, or geographic parameters, and the like. In some embodiments, appending triadic match 130 to a database may enable processor 104 to accumulate a structured corpus of historical record data 118, which may subsequently be used to retrain triadic machine-learning model 132, evaluate facilitator performance, generate absence scores, or analyze long-term service trends. In some embodiments, each appended entry in historical record data 188 may include outcome indicators, such as session completion status, user feedback, or check-in status 152, allowing processor 104 to assess the effectiveness and reliability of past triadic match decisions. In some embodiments, processor XXX may periodically query or retrieve triadic match data from a database to support predictive scheduling, cohort-specific optimization, or administrative reporting.

With continued reference to FIG. 1, memory 106 contains instructions configuring processor 104 to modify a graphical user interface 146 as a function of a triadic match 130. In some embodiments, graphical user interface 146 may include any information related to triadic match 130 first user profile data 108, second user profile data 110, third user profile data 112, decision parameters 140, weight distribution 142, external data 136, and any data used or processed in this disclosure. For the purposes of this disclosure, a "user interface" is a means by which a user and a computer system interact; for example through the use of input devices and software. A user interface may include a graphical user interface (GUI) 146, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with users 102a-c. In some embodiments, users 102a-c may interact with the use interface using a computing device distinct from and communicatively connected to at least a processor 104. For example, a smart phone, smart, tablet, or laptop operated by users 102a-c. In an embodiment, user interface may include a graphical user interface 146. A "graphical user interface," as used herein, is a graphical form of user interface that allows users to interact with electronic devices. In some embodiments, GUI 146 may include icons, menus, other visual indicators or representations (graphics), audio indicators such as primary notation, and display information and related user controls. A menu may contain a list of choices and may allow users 102a-c to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs, and the like because clicking on them yields instant access.

With continued reference to FIG. 1, in an embodiment, generating graphical user interface 146 may include generating real-time alerts triggered by check-in status 152 or triadic match 130. These real-time alerts may be configured to notify users 102a-c when triadic match 130 is determined, when record failure is logged, check-in status 152 is negative, and the like. The graphical user interface (GUI) may also incorporate a filter option that allows users to sort specific profile data or triadic match 130, such as "scheduled," "pending," or "not scheduled." This filtering capability enables users 102a-c to view profile data or triadic match 130, allowing for quick identification and review of triadic match 130 or related profile data (e.g., first user profile data 108, second user profile data 110 and third user profile data 112).

With continued reference to FIG. 1, in some cases, GUI 146 may include one or more event handlers. An "event handler" as used in this disclosure is a callback routine that operates asynchronously once an event takes place. Event handlers may include, without limitation, one or more programs to perform one or more actions based on user input (e.g., user interaction), such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input (e.g., user interaction) may include a manipulation of computer icons, such as, but not limited to, clicking, selecting, dragging and dropping, scrolling, and the like. In some embodiments, user input (e.g., user interaction) may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI 146.

With continued reference to FIG. 1, in some cases, the interactivity of GUI 146 may allow users to manipulate graphical elements and a plurality of event handlers that detects various changes in the graphical elements and triggers generation or changes in event attributes, execution profiles and visual representations. In some embodiments, users 102a-c may manipulate graphical elements, such as dragging or resizing timeline bars, adjusting start and end dates, or modifying production estimates, which directly trigger updates to underlying event attributes. Furthermore, GUI 146 may provide an intuitive interface for comparing different progress scenarios. In some embodiments, modifying graphical user interface 146 may include generating a graphical element configured to render a set of candidate triadic sessions corresponding to triadic match 130. For the purposes of this disclosure, a "graphical element" is a visual component rendered within a graphical user interface that presents session-related information or allows user interaction related to a triadic match. In an embodiment, a graphical element may include, but is not limited to, buttons, icons, lists, calendars, visual indicators, or interactive components that display or control information associated with triadic matches, user availability, or session scheduling. For example, and without limitation, processor 104 may generate a graphical element to render a list of candidate triadic sessions, highlight compatibility scores 144, allow acceptance or rejection of proposed sessions, or visualize session conflicts. In some embodiments, graphical elements may be dynamically updated based on changes to user profile data, system-detected conflicts, or manual overrides, and may be displayed on administrator or user-facing interfaces. For the purposes of this disclosure, "candidate triadic sessions" are proposed combinations of a first user, a second user, and a third user as potentially valid triadic matches. In an embodiment, candidate triadic sessions may be generated prior to final triadic match selection and may represent multiple alternative scheduling or user pairing options that satisfy basic feasibility constraints. For example, and without limitation, candidate triadic sessions may be displayed through graphical element for administrative review, sorted by descending compatibility score 144, and/or individually accepted or rejected by users 102*a-c*. In some embodiments, processor 104 may generate, evaluate, and refine candidate triadic sessions in real time based on availability changes, external disruptions, or session feedback.

With continued reference to FIG. 1, in some embodiments, processor 104 may be configured to receive a user interaction through GUI 146. For the purposes of this disclosure, a "user interaction" is an input representing an action taken by a user in response to a displayed information on a graphical user interface. In an embodiment, user interaction may include, but is not limited to, selecting, confirming, modifying, or rejecting a candidate triadic session, as well as providing feedback, navigating interface components, or submitting scheduling preferences. User interaction may be received from users 102*a-c*. For example, and without limitation, a user may interact with a displayed list of candidate triadic sessions by selecting a preferred session, rejecting a proposed combination, or providing a manual override. In some embodiments, processor 104 may use user interaction to update decision logic, modify weight distributions, append triadic match 130 to a database (e.g., user database 122) or regenerate session proposals in real time. As a non-limiting example, user interaction may include typed text. In some embodiments, user interaction may include gestures such as swiping or dragging to rearrange elements, voice commands, or file uploads. In some embodiments, user interaction may include a manipulation of computer icons or graphical element, such as, but not limited to, clicking, selecting, dragging and dropping, scrolling, and the like. In some embodiments, user interaction may be associated with a manipulation of graphical elements of GUI 146. In some embodiments, modifying graphical user interface 146 may include receiving a user interaction from graphical user interface 146, wherein the user interaction may include a candidate session rejection and modifying weight distribution 142 of a plurality of decision parameters 140 as a function of the user interaction. For the purposes of this disclosure, a "candidate session rejection" is a type of user interaction in which a proposed candidate triadic session is explicitly declined or marked as unsuitable by a user. In an embodiment, candidate session rejection may occur when the proposed session does not meet user preferences, logistical constraints, or anticipated engagement requirements. For example, and without limitation, a first user 102*a* may reject a candidate session involving a facilitator with a low reliability score or a scheduling conflict. In some embodiments, processor 104 may log candidate session rejection events and use them to modify weight distribution 142 applied to decision parameters 140, filter future session proposals, or trigger alternate triadic match generation. In an embodiment, processor 104 may interpret certain user interactions, such as a candidate session rejection, as an indication that current weight distribution 142 does not align with operational needs or user preferences. For example, and without limitation, if a first user 102*a* repeatedly rejects candidate triadic sessions that include second user 102*b* located beyond a specific travel distance, processor 104 may increase the weight assigned to the physical proximity parameter and decrease the weight assigned to decision parameters 140. In some embodiments, candidate session rejection may serve as implicit feedback used to retrain or refine triadic machine-learning model 132.

Figure 2A:
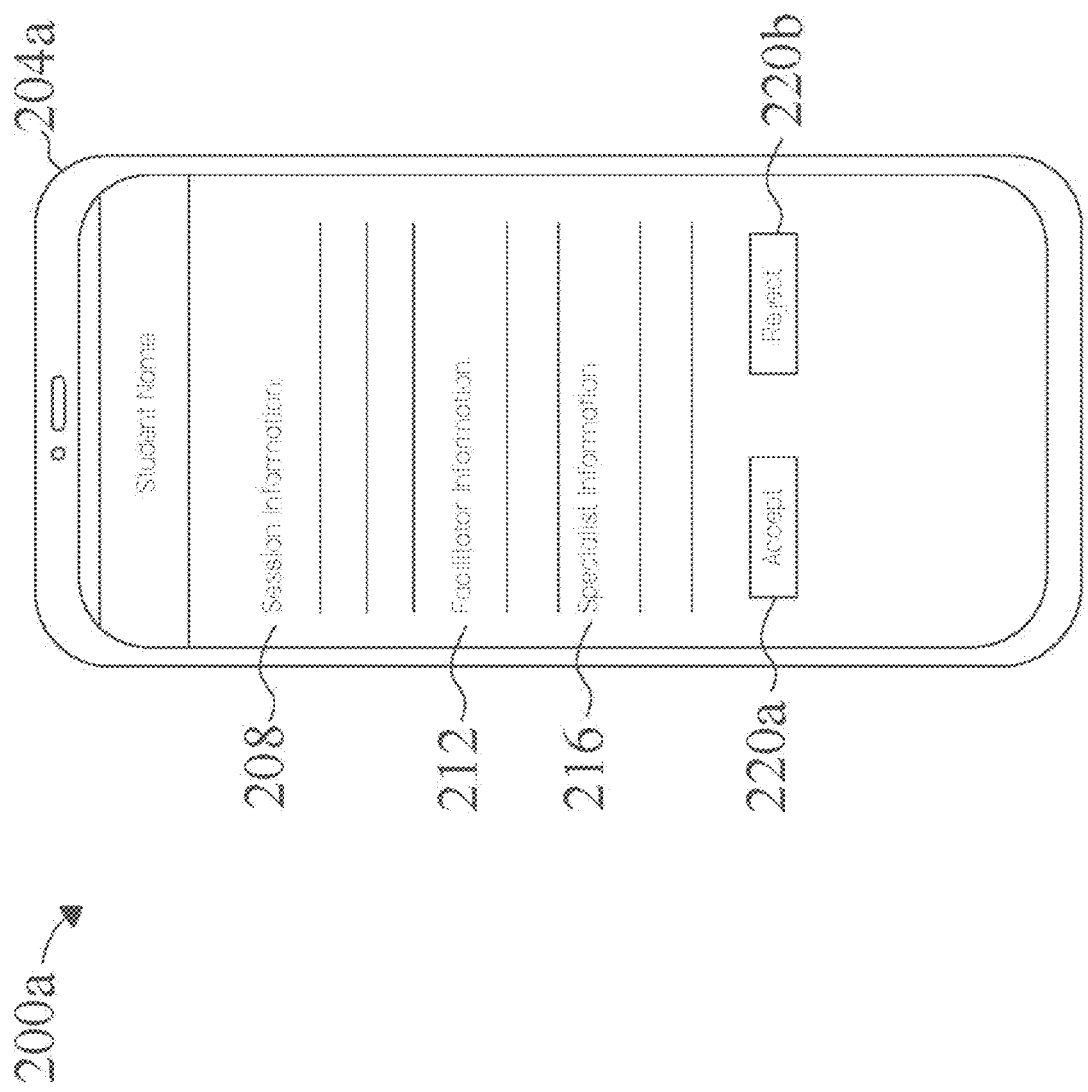
FIGS. 2A-C illustrate exemplary user interfaces.
Figure 2B:
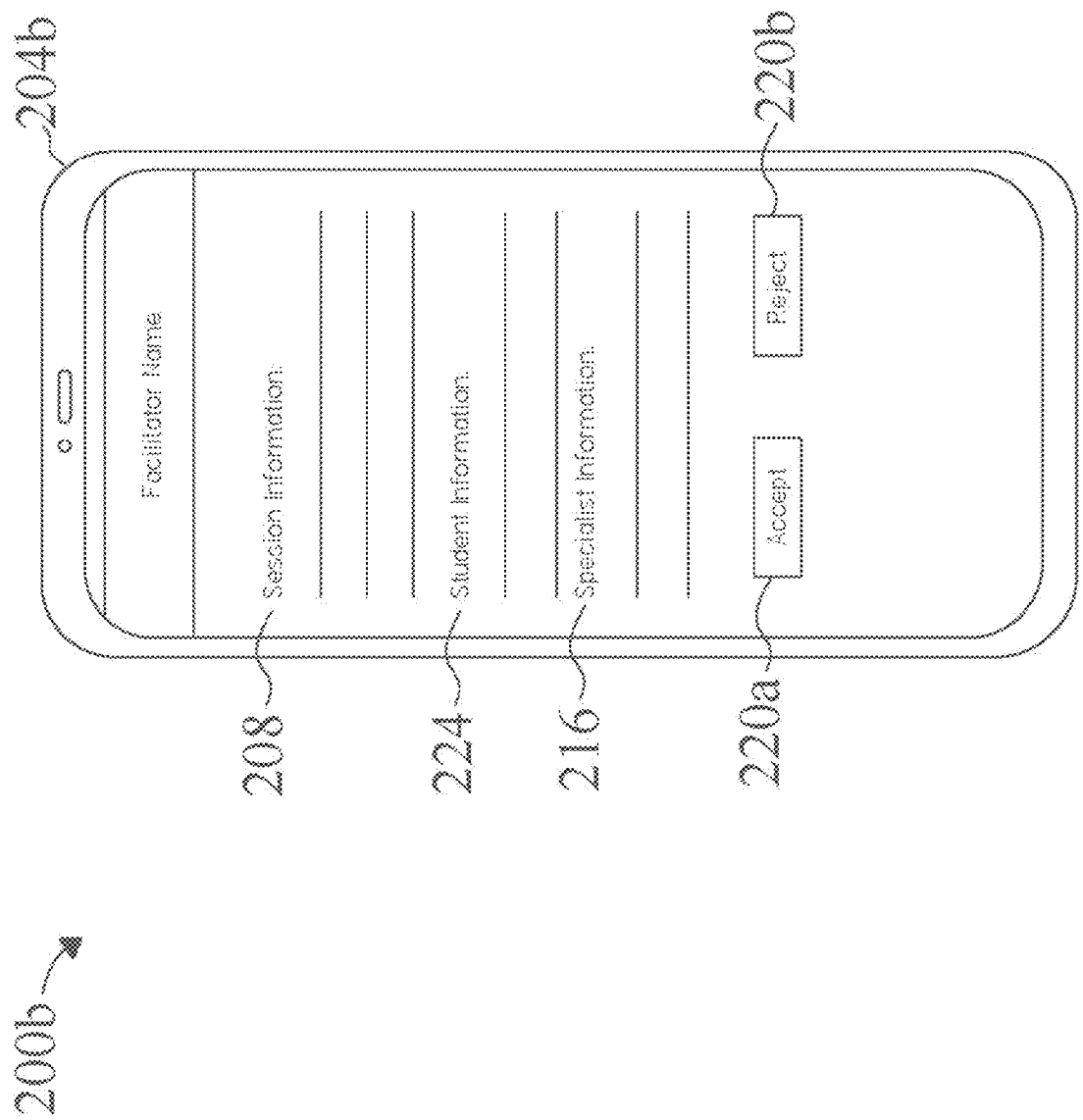
Figure 2C:
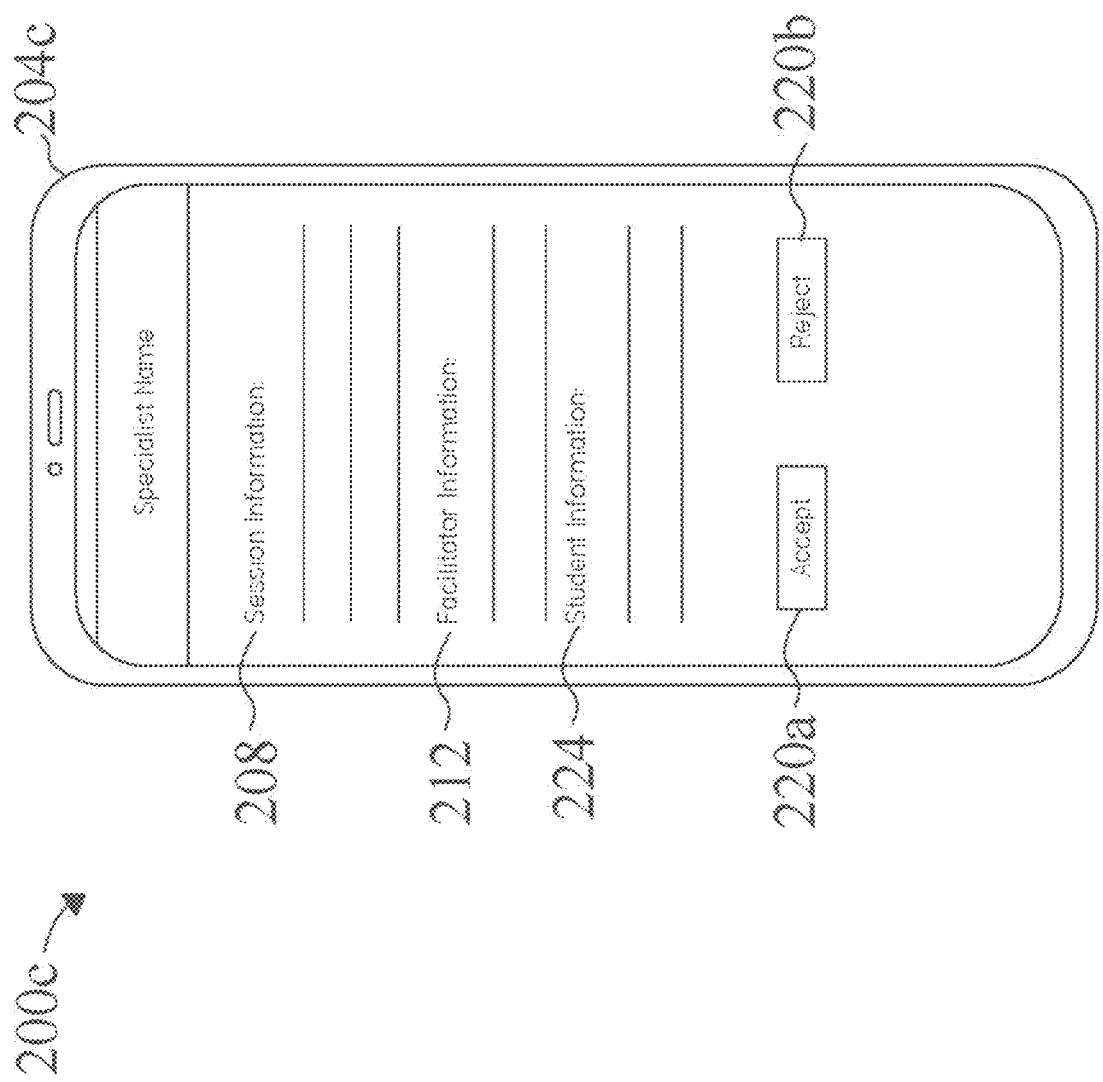

Referring now to FIGS. 2A-C, exemplary graphical user interfaces 200*a-c* are illustrated. In some embodiments, graphical user interface 200*a-c* may be displayed on display devices 204*a-c*. In an embodiment, graphical user interface 200*a* shown in FIG. 2A is associated with a first user 102*a*, such as a student participating in a triadic session. Graphical user interface 200*a* may display session details relevant to the student, information of triadic match 208, including scheduled triadic session time, assigned facilitator information (second user profile data 212), and the assigned specialist information (third user profile data 216). In some cases, a first graphical user interface 200*a* may include a list of candidate triadic sessions, candidate triadic matches or triadic match, each including a proposed first user, second user, and third user, along with associated metadata such as session time, location, and compatibility score. In some embodiments, graphical user interface 200*a* may include interactive graphical elements 220*a-b* that allow a first user to view detailed user profiles, confirm (using graphical element 220*a*) or reject (using graphical element 220*b*) candidate sessions, or request reconfiguration of session parameters.

With continued reference to FIGS. 2A-C, FIG. 2B illustrates graphical user interface 200*b* associated with a second user, such as a facilitator. In an embodiment, graphical user interface 200*b* may present a facilitator-facing scheduling dashboard displaying information of triadic match 208, check-in requirements, assigned students information (first user profile data 224), and corresponding remote specialists information (third user profile data 216). In some embodiments, graphical user interface 200*b* may include a graphical element configured to perform GPS-based check-in operations, display location validation status, and report compliance history. In some embodiments, graphical user interface 200*b* may include interactive graphical elements 220*a-b* that allow a second user to view detailed user profiles, confirm (using graphical element 220*a*) or reject (using graphical element 220*b*) candidate sessions, or the like.

With continued reference to FIGS. 2A-C, FIG. 2C illustrates graphical user interface 200*c* associated with a third user, such as a remotely located specialist or therapist. In an embodiment, graphical user interface 200*c* may display information of assigned students (first user profile data 224), information of triadic match 208 including triadic session times, facilitator information (second user profile data 212), and session-specific service notes. In some embodiments, graphical user interface 200*c* may include integration with remote communication tools, documentation fields for progress reporting, and visual indicators of compatibility scores or user classification groups. In some embodiments, graphical user interface 200*c* may include interactive graphical elements 220*a-b* that allow a third user to view detailed user profiles, confirm (using graphical element 220*a*) or reject (using graphical element 220*b*) candidate sessions, or the like. Each of the interfaces shown in FIGS. 2A-2C may be dynamically generated and updated by processor 104 in response to changes in triadic match, user profile data, or real-time user interaction.

Figure 3:
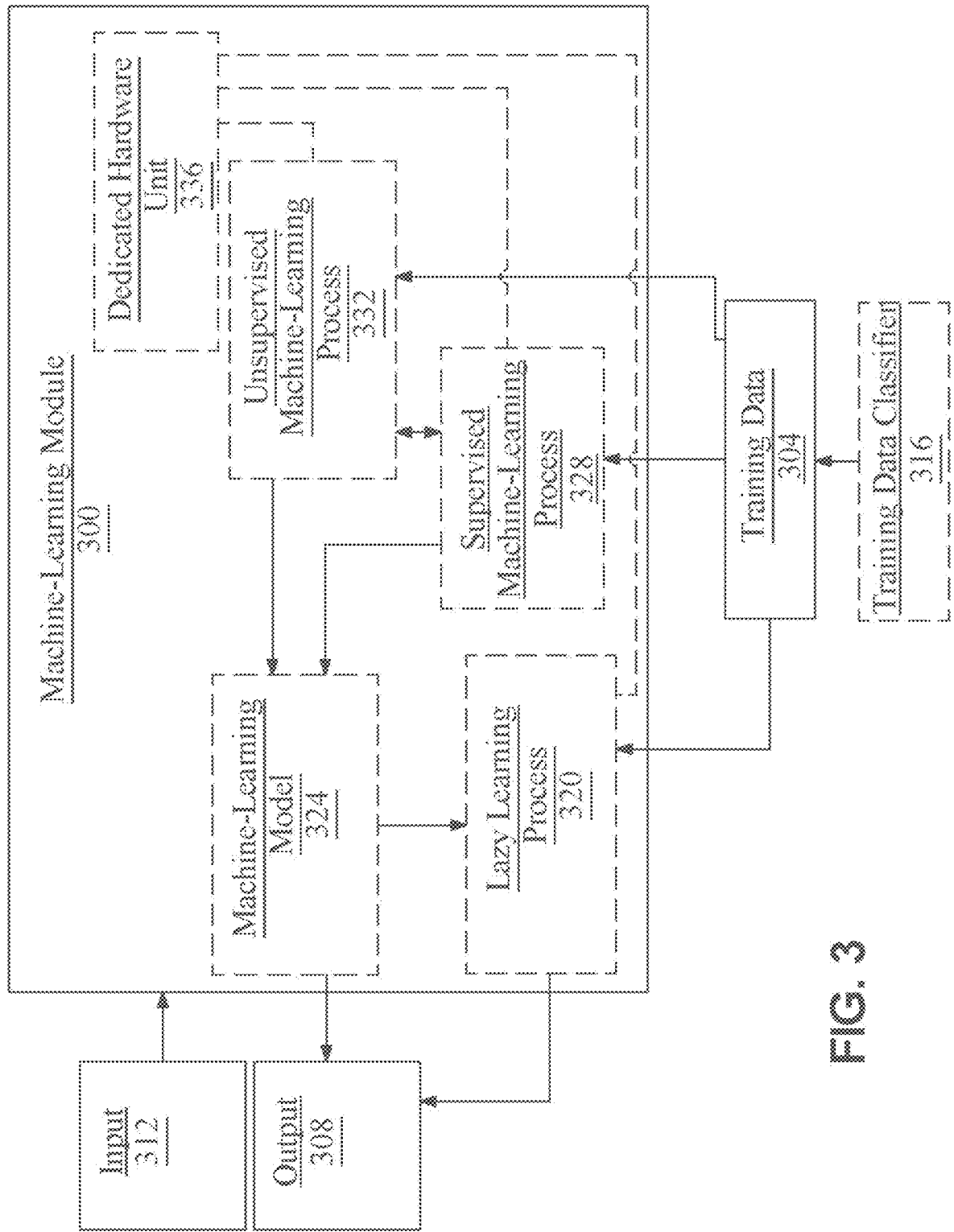
FIG. 3 illustrates a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include first user profile data, second user profile data, third user profile data, first user classification groups, decision parameters, weight distribution, absence score, user interaction, compatibility score, external data, and the like. As a non-limiting illustrative example, output data may include first user classification groups, decision parameters, weight distribution, compatibility score, triadic match, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to first user classification groups associated with a first user descriptor such as deficiency type, severity, interaction requirements, and the like.

Still referring to FIG. 3, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2}$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as input or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328.

At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include first user profile data, second user profile data, third user profile data, first user classification groups, decision parameters, weight distribution, absence score, user interaction, compatibility score, external data, and the like as described above as inputs, first user classification groups, decision parameters, weight distribution, compatibility score, triadic match, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including, without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
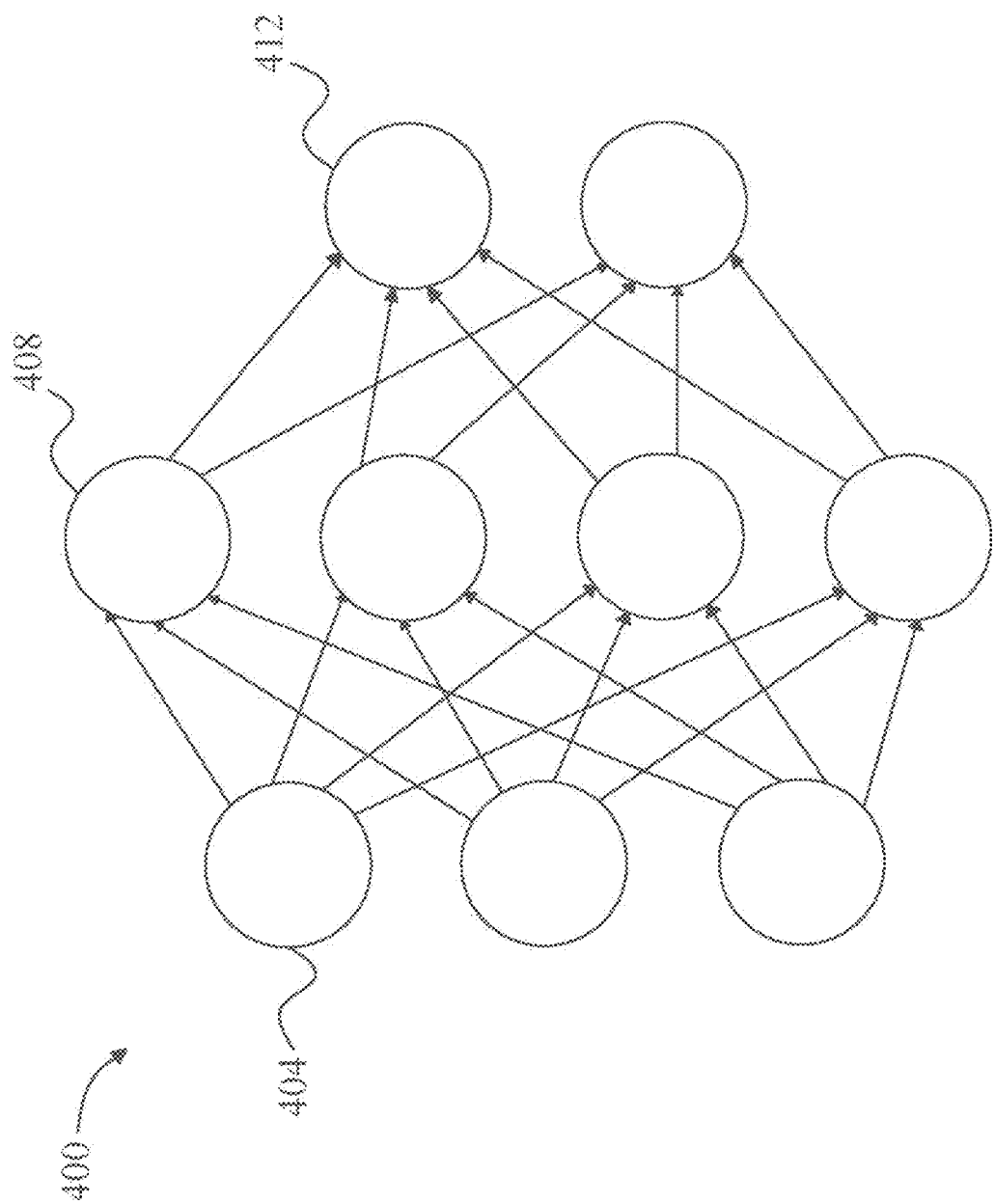
FIG. 4 illustrates a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
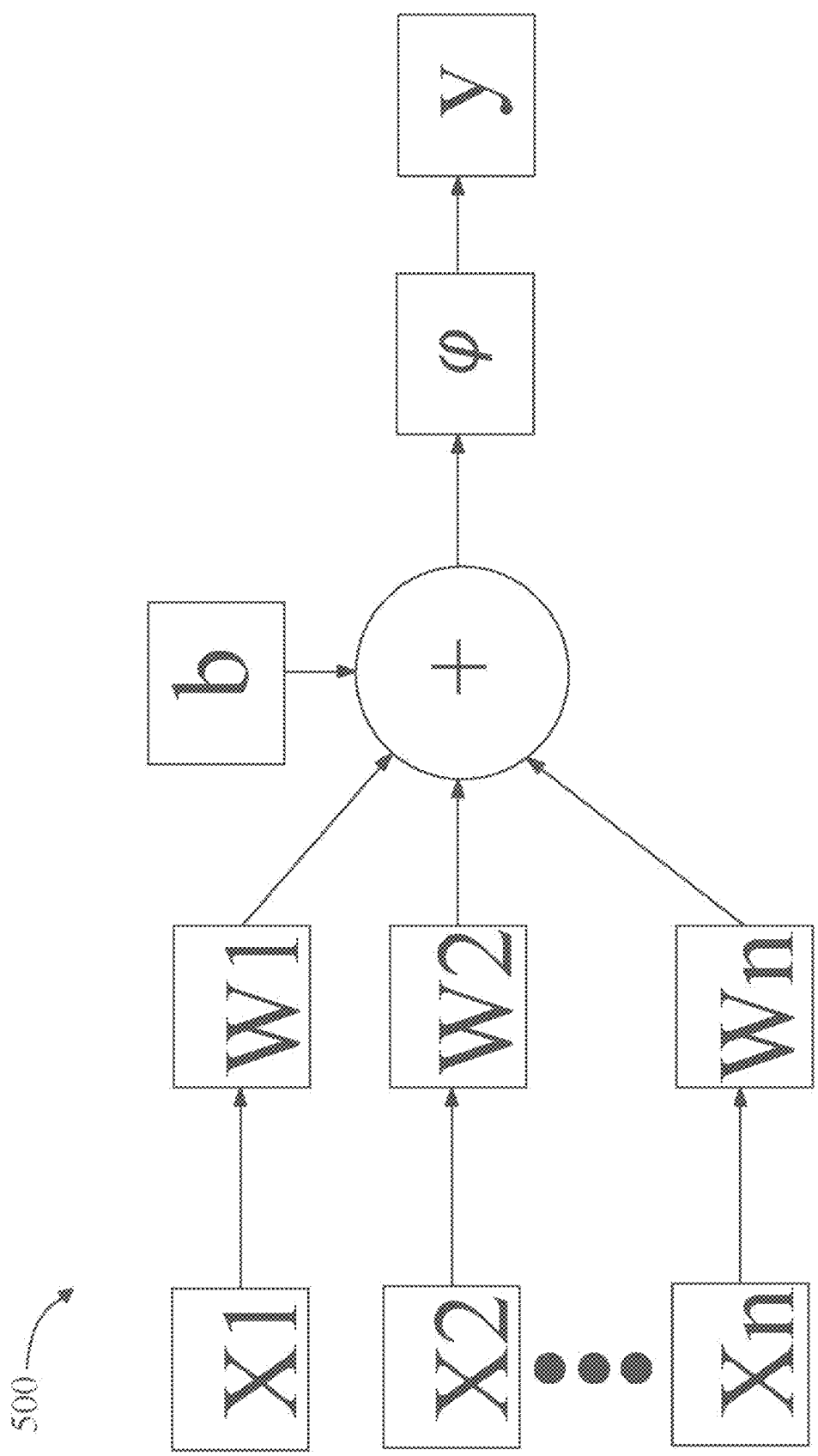
FIG. 5 illustrates a block diagram of an exemplary node in a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tanh($\sqrt{2/\pi}$(x+bx^r))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
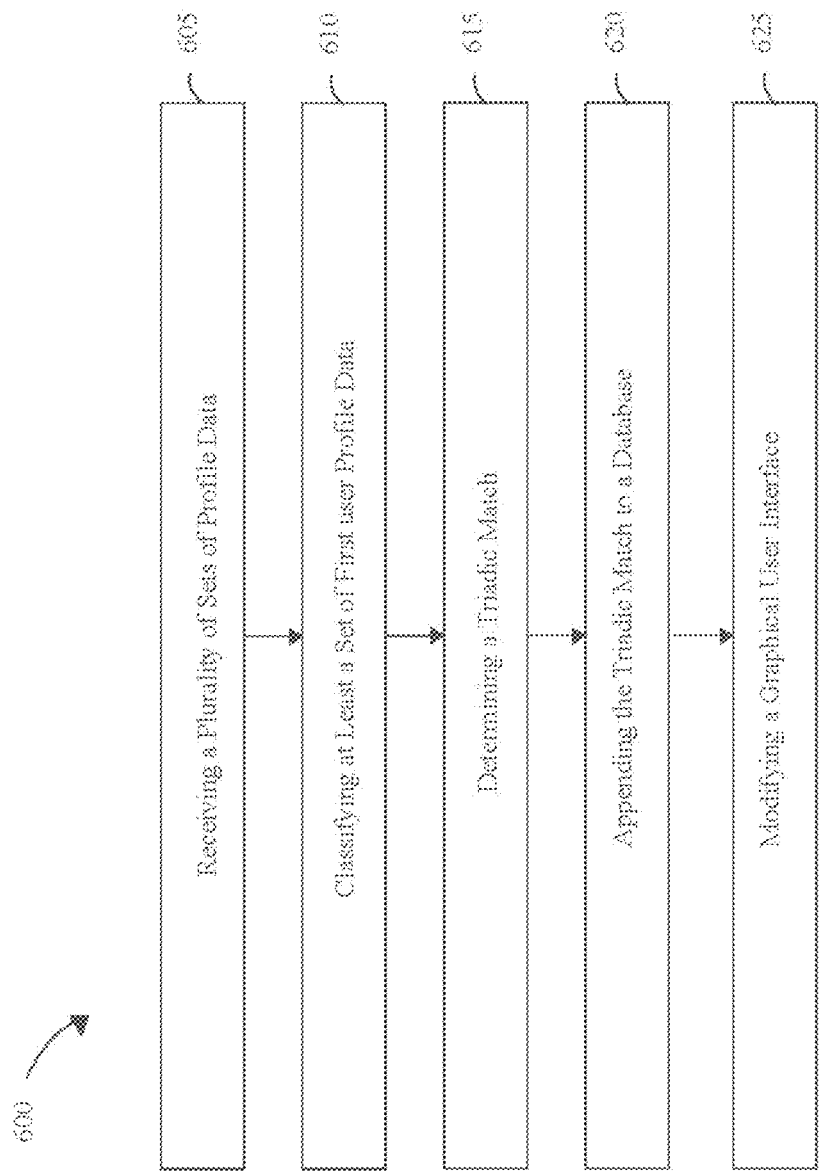
FIG. 6 illustrates a flow diagram of an exemplary method for triadic user matching based on profile data.

Referring now to FIG. 6, a flow diagram of an exemplary method 600 for triadic user matching based on profile data is illustrated. Method 600 contains a step 605 of receiving, using at least a processor, a plurality of sets of profile data including a set of first user profile data associated with at least one first user, a set of second user profile data associated with at least one second user, and a set of third user profile data associated with at least one third user, wherein each of the plurality of sets of profile data includes a temporal availability element and the set of first user profile data includes a first user descriptor. These may be implemented as reference to FIGS. 1-5.

With continued reference to FIG. 6, method 600 contains a step 610 of classifying, using at least a processor, a set of first user profile data into one or more first user classification groups based on a first user descriptor. In some embodiments, classifying the set of first user profile data may include classifying the set of first user profile data to the one or more first user classification groups as a function of a deficiency type, severity, or interaction requirements of the first user descriptor. In some embodiments, classifying the set of first user profile data may include using a classification group classifier that has been trained on classification group training data including exemplary first user profile data correlated to exemplary first user classification groups. These may be implemented as reference to FIGS. 1-5.

With continued reference to FIG. 6, method 600 contains a step 615 of determining, using at least a processor, a triadic match including at least one second user and at least one third user associated with at least one first user as a function of a temporal availability element of each of a plurality of sets of profile data and the one or more first user classification groups using a triadic machine-learning model that has been trained on historical triadic match data. In some embodiments, determining the triadic match may include selecting a weight distribution over a plurality of decision parameters of the triadic machine-learning model as a function of the one or more first user classification groups, and determining a compatibility score for each potential triadic match by applying the selected weight distribution to the plurality of decision parameters. In some embodiments, determining the triadic match may include generating an absence score of the at least one second user based on historical record data of the second user profile, and determining the triadic match as a function of the absence score. In some embodiments, determining the triadic match may include determining a triadic session time as a function of the temporal availability element of each of the profile data, receiving a GPS signal from a device associated with the at least one second user at the triadic session time, determining a check-in status of the at least one second user by comparing GPS coordinates of the GPS signal with a location of the at least one first user. In some embodiments, determining the triadic match may include logging an event as a record failure in historical record data when the check-in status indicates that a location of the at least one second user does not correspond to the location of the at least one first user at the triadic session time. In some embodiments, selecting the weight distribution may include selecting the weight distribution over at least a physical proximity between the at least one first and second users as a function of a deficiency type of the one or more first user classification groups. In some embodiments, determining the triadic match may include parsing external data including weather data, determining an availability disruption as a function of the external data and the set of second user profile data, and determining the triadic match as a function of the availability disruption. These may be implemented as reference to FIGS. 1-5.

With continued reference to FIG. 6, method 600 contains a step 620 of appending, using at least a processor, a triadic match to a database as at least a portion of historical record data. In some embodiments, appending the triadic match may include receiving a user interaction from a graphical user interface, wherein the user interaction may include a candidate session rejection, and appending the triadic match as a function of the user interaction. These may be implemented as reference to FIGS. 1-5.

With continued reference to FIG. 6, method 600 contains a step 625 of modifying, using at least a processor, a graphical user interface as a function of a triadic match. This may be implemented as reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
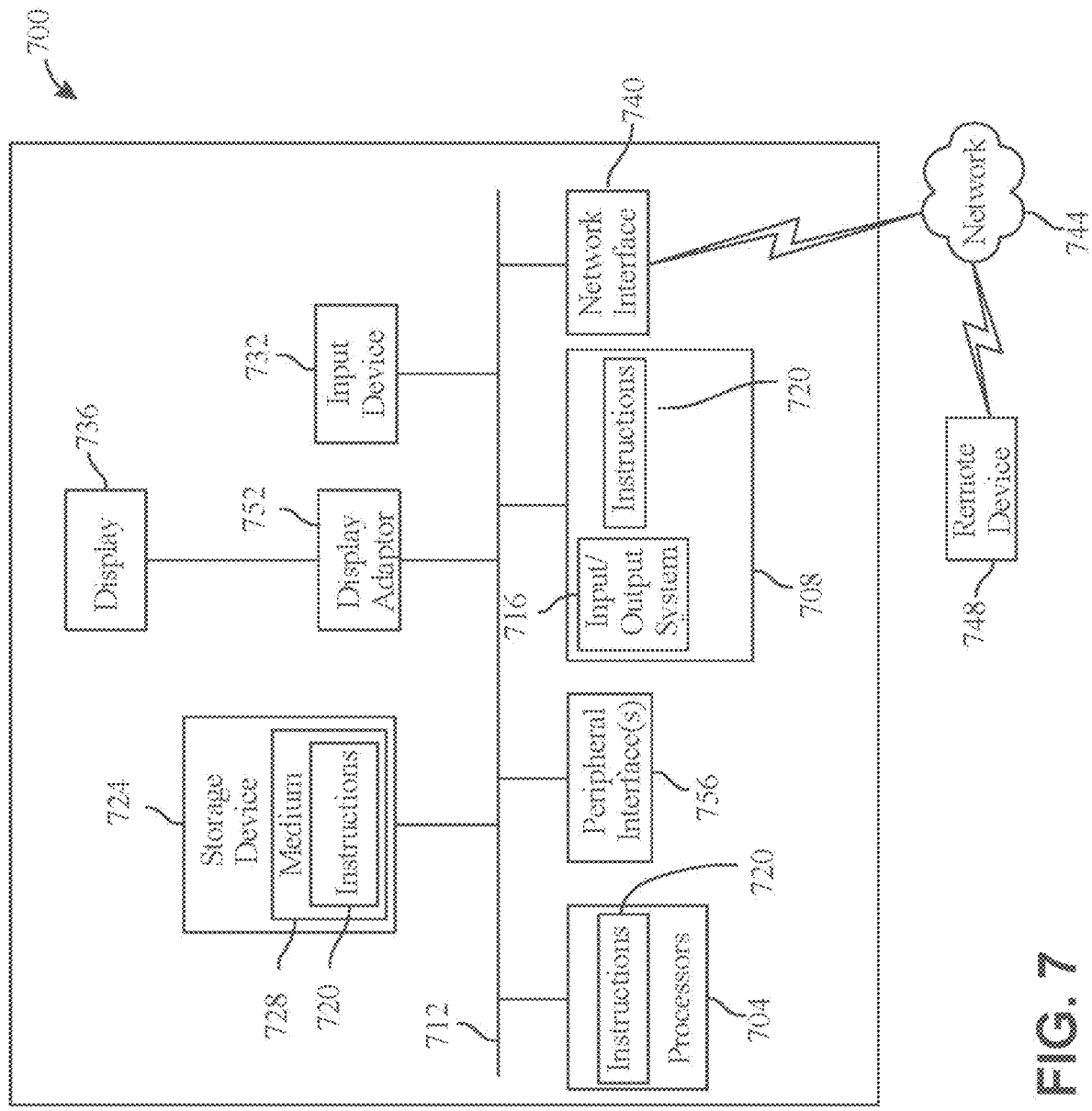
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicates with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulpo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or more embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, an LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU; (2) VMware by Broadcom Inc of Palo Alto, California; (3) VirtualBox by Oracle Corporation headquartered in Austin, Texas; and (4) kernel-based virtual machine (KVM).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for triadic user matching based on profile data, the apparatus comprising:
   at least a processor; and
   a memory communicatively connected to the at least a processor, wherein the memory contains instructions that, when executed by the at least a processor, configure the at least a processor to:
   receive a plurality of sets of profile data comprising a set of first user profile data associated with at least one first user, a set of second user profile data associated with at least one second user, and a set of third user profile data associated with at least one third user, wherein:
      each of the plurality of sets of profile data comprises a temporal availability element and the set of first user profile data comprises a first user descriptor;
   classify the set of first user profile data into one or more first user classification groups based on the first user descriptor;
   determine a triadic match comprising the at least one second user and the at least one third user associated with the at least one first user as a function of the temporal availability element of each of the plurality of sets of profile data and the one or more first user classification groups using a triadic machine-learning model that has been trained on historical triadic match data;
   append the triadic match to a database as at least a portion of historical record data; and
   modify a graphical user interface as a function of the triadic match.

2. The apparatus of claim 1, wherein classifying the set of first user profile data comprises classifying the set of first user profile data to the one or more first user classification groups as a function of a deficiency type, severity, or interaction requirements of the first user descriptor.

3. The apparatus of claim 1, wherein classifying the set of first user profile data comprises using a classification group classifier that has been trained on classification group training data comprising exemplary first user profile data correlated to exemplary first user classification groups.

4. The apparatus of claim 1, wherein determining the triadic match comprises:
   generating an absence score of the at least one second user based on the historical record data; and
   determining the triadic match as a function of the absence score.

5. The apparatus of claim 1, wherein determining the triadic match comprises:
- determining a triadic session time as a function of the temporal availability element of each of the plurality of sets of profile data;
- receiving a global positioning system (GPS) signal from a device associated with the at least one second user at the triadic session time; and
- determining a check-in status of the at least one second user by comparing GPS coordinates of the GPS signal with a location of the at least one first user.

6. The apparatus of claim 5, wherein determining the triadic match comprises:
- logging an event as a record failure in the historical record data when the check-in status indicates that a location of the at least one second user does not correspond to the location of the at least one first user at the triadic session time.

7. The apparatus of claim 1, wherein determining the triadic match comprises:
- parsing external data comprising weather data;
- determining an availability disruption as a function of the external data and the set of second user profile data; and
- determining the triadic match as a function of the availability disruption.

8. The apparatus of claim 1, wherein determining the triadic match comprises
- selecting a weight distribution over a plurality of decision parameters of the triadic machine-learning model as a function of the one or more first user classification groups; and
- determining a compatibility score for each potential triadic match by applying the selected weight distribution to the plurality of decision parameters.

9. The apparatus of claim 8, wherein selecting the weight distribution comprises selecting the weight distribution over at least a physical proximity between the at least one first and second users as a function of a deficiency type of the one or more first user classification groups.

10. The apparatus of claim 1, wherein appending the triadic match comprises:
- receiving a user interaction from the graphical user interface, wherein the user interaction comprises a candidate session rejection; and
- appending the triadic match as a function of the user interaction.

11. A method for triadic user matching based on profile data, the method comprising:
- receiving, using at least a processor, a plurality of sets of profile data comprising a set of first user profile data associated with at least one first user, a set of second user profile data associated with at least one second user, and a set of third user profile data associated with at least one third user, wherein:
  - each of the plurality of sets of profile data comprises a temporal availability element and the set of first user profile data comprises a first user descriptor;
- classifying, the at least a processor, the set of first user profile data into one or more first user classification groups based on the first user descriptor;
- determining, the at least a processor, a triadic match comprising the at least one second user and the at least one third user associated with the at least one first user as a function of the temporal availability element of each of the plurality of sets of profile data and the one or more first user classification groups using a triadic machine-learning model that has been trained on historical triadic match data;
- appending, the at least a processor, the triadic match to a database as at least a portion of historical record data; and
- modifying, the at least a processor, a graphical user interface as a function of the triadic match.

12. The method of claim 11, wherein classifying the set of first user profile data comprises classifying the set of first user profile data to the one or more first user classification groups as a function of a deficiency type, severity, or interaction requirements of the first user descriptor.

13. The method of claim 11, wherein classifying the set of first user profile data comprises using a classification group classifier that has been trained on classification group training data comprising exemplary first user profile data correlated to exemplary first user classification groups.

14. The method of claim 11, wherein determining the triadic match comprises:
- generating an absence score of the at least one second user based on the historical record data; and
- determining the triadic match as a function of the absence score.

15. The method of claim 11, wherein determining the triadic match comprises:
- determining a triadic session time as a function of the temporal availability element of each of the plurality of sets of profile data;
- receiving a global positioning system (GPS) signal from a device associated with the at least one second user at the triadic session time; and
- determining a check-in status of the at least one second user by comparing GPS coordinates of the GPS signal with a location of the at least one first user.

16. The method of claim 15, wherein determining the triadic match comprises:
- logging an event as a record failure in the historical record data when the check-in status indicates that a location of the at least one second user does not correspond to the location of the at least one first user at the triadic session time.

17. The method of claim 11, wherein determining the triadic match comprises:
- parsing external data comprising weather data;
- determining an availability disruption as a function of the external data and the set of second user profile data; and
- determining the triadic match as a function of the availability disruption.

18. The method of claim 11, wherein determining the triadic match comprises
- selecting a weight distribution over a plurality of decision parameters of the triadic machine-learning model as a function of the one or more first user classification groups; and
- determining a compatibility score for each potential triadic match by applying the selected weight distribution to the plurality of decision parameters.

19. The method of claim 18, wherein selecting the weight distribution comprises selecting the weight distribution over at least a physical proximity between the at least one first and second users as a function of a deficiency type of the one or more first user classification groups.

20. The method of claim 11, wherein appending the triadic match comprises:
- receiving a user interaction from the graphical user interface, wherein the user interaction comprises a candidate session rejection; and
- appending the triadic match as a function of the user interaction.

* * * * *